Figure 1:
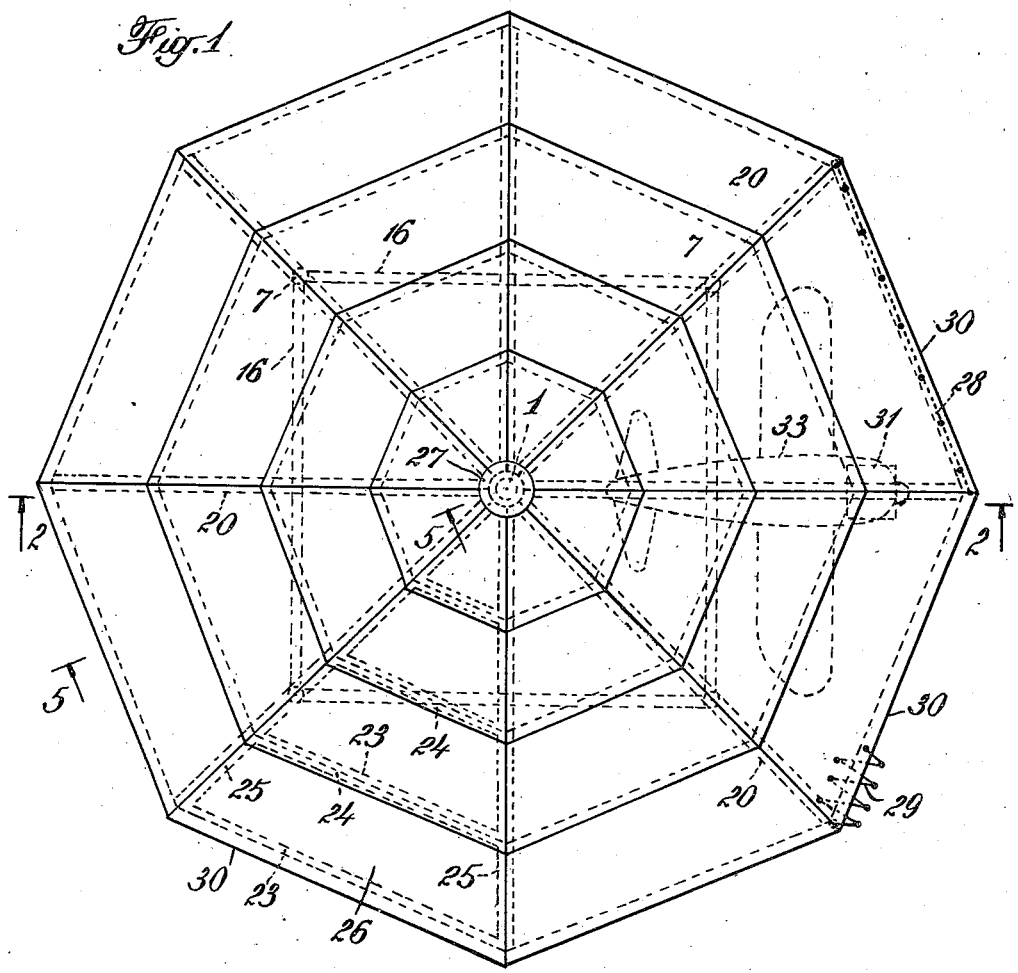

May 12, 1942. H. CURRAN 2,282,756
HANGAR
Filed Nov. 6, 1941 2 Sheets-Sheet 1

INVENTOR
Hugh Curran
BY
Pennie Davis Marvin & Edmonds
ATTORNEYS

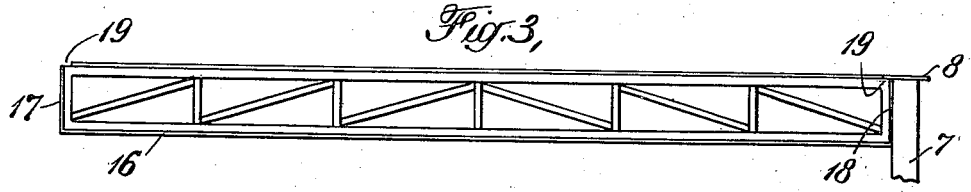
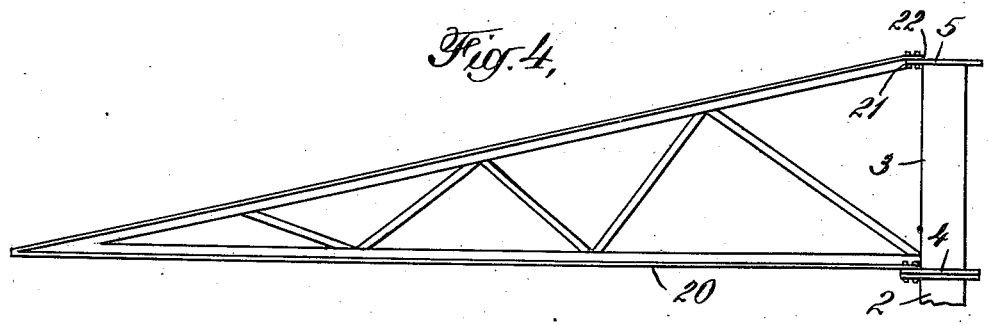
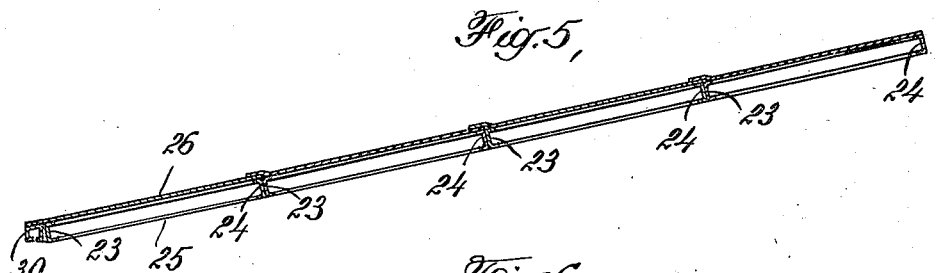
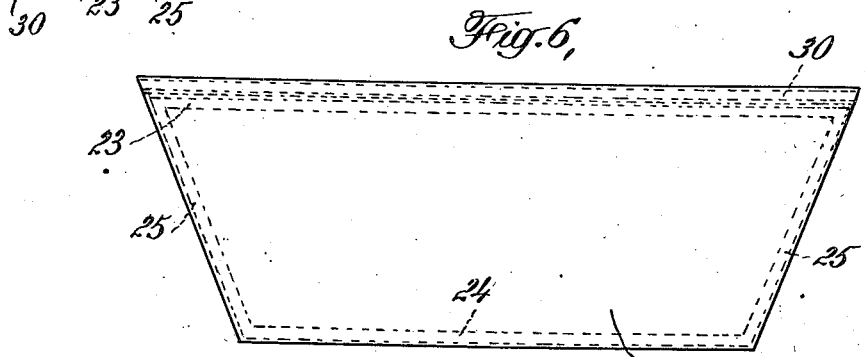
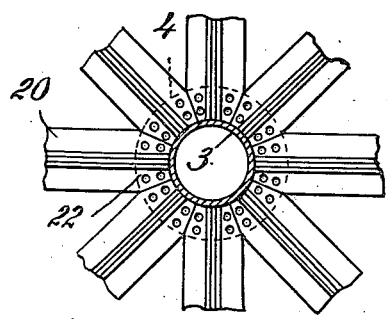

Patented May 12, 1942

2,282,756

UNITED STATES PATENT OFFICE 2,282,756

HANGAR

Hugh Curran, Bakersfield, Calif.

Application November 6, 1941, Serial No. 417,979

4 Claims. (Cl. 189—1.5)

This invention relates to improvements in hangars for housing aircraft. My invention provides a novel hangar construction in which practically all of the covered space is usefully available and readily accessible for the primary objective of housing aircraft. Further advantages of my novel structure are its adaptability to manufacture by production methods and its portability. Portability is derived from the circumstance that it is so designed that it may readily be dismantled into a relatively small number of structural units that are small enough for convenient transportation but which may be quickly and conveniently assembled, and from the further circumstance that extensive and complicated foundation construction is not required.

Recent increases in the number and scope of distribution of airplanes in the field of both military and civil aeronautics have for some time created a demand for an aircraft housing structure adapted for housing a relatively small number of aircraft but which would nevertheless permit practically all of the covered space to be usefully available and readily accessible, yet which would not require the use of expensive and complicated specially prepared foundations nor the use of structural shapes other than those readily available.

In the field of civil aeronautics the development and rapidly increasing distribution of small airplanes which do not require extensive landing space has created a tendency away from centralized housing at relatively large airports with the inconvenience and congestion resulting from their use. In the field of military aeronautics this tendency toward decentralization has been even more marked and the resultant problem is even more acute than in the field of civil aeronautics because of the circumstance that a relatively high concentration of such decentralized housing structures may be needed in a given locality at one time and in another locality at another time. However, an unreasonable economic burden would result from any attempt simultaneously to provide such a high concentration of decentralized housing structures in all localities where there is a probability that the need therefor might arise. The novel hangar construction of my invention is admirably suited to deal with these problems for a number of reasons. The fact that only a simple and inexpensive foundation construction is required would permit the installation, at a relatively small cost, of a large number of such foundations in any locality where there is any probability of future need for a high concentration of such housing structures. The adaptability of my improved structure to manufacture by quantity production methods and in particular its adaptability to prefabrication into a relatively small number of readily transportable structural units which may be quickly assembled by unskilled labor makes feasible the erection of a large number of such housing structures in a minimum period of time and at a minimum of expense in any one locality. Likewise, it makes feasible the dismantling of such structures into readily transportable structural units, their transportation, and their re-assembly in another locality as the need therefor should arise, all with a minimum of time, expense, effort and confusion.

The assembled housing structure of my invention is polygonal in plan, preferably octagonal, and it employs no vertical roof supports at the periphery thus providing a maximum of accessibility. The roof-covering, comprising several similar series of panels, is supported on a plurality of tapered lattice girders which are attached to and radiate from a central mast at equally spaced angular intervals. These tapered roof-carrying girders are so shaped and so attached to the central mast that their lower edges will lie in a horizontal plane. Auxiliary support for the radial roof-carrying girders is furnished by an auxiliary column positioned roughly midway between the central mast and the outer extremity of each alternate radial girder, preferably somewhat closer to the outer extremity than to the central mast, and by horizontal lattice girders extending between auxiliary supporting columns and attached thereto adjacent their upper ends.

In the preferred octagonal construction, support from the ground, that is from the foundations, is furnished only at five points; namely at the lower ends of the central mast and four auxiliary supporting columns. The lower end of the central mast and the lower ends of the auxiliary columns are preferably fitted with flanges. These flanges are drilled to receive the bolts by which the entire roof-supporting structure is attached to the foundations.

In the preferred foundation construction concrete piers are spaced to register generally with the central mast and with the auxiliary supporting columns, and relatively short sections of materials corresponding to those forming the main bodies of the mast and auxiliary supporting columns are embedded in the piers. These embedded sections are provided at their upper ends with flanges similar to those attached to the lower ends of the central mast and auxiliary supporting columns. The flanges which thus form a part of the foundations and those attached to the lower ends of the central mast and supporting columns are drilled to receive connecting bolts at intervals spaced in all instances to register with a standard gage. This arrangement not only provides firm support and anchorage for the roof-supporting structure but it has the advantage of permitting advance installation of numerous foundations with the assurance that subsequent erection of the superstructures thereon, irrespective of whether the material for the superstructures is derived from storage, from new construction or from the dismantling of a previously erected building, will not encounter difficulties or delays occasioned by failure of foundation bolts to register with flanges carried by the mast and auxiliary supporting columns.

Figure 2:
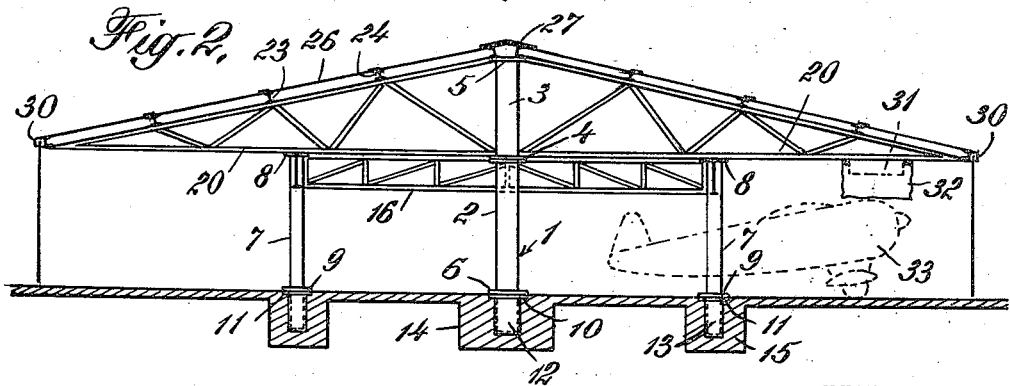

My invention will be further described with reference to the accompanying drawings which illustrate one preferred form of hangar construction embodying my invention. Other advantages of my novel hangar construction will be apparent from this further and more detailed description. In the drawings Fig. 1 is a plan view of an octagonal shaped hangar embodying my invention. Fig. 2 is a vertical section along the line 2—2 of Fig. 1. Fig. 3 is an enlarged elevation of one of the horizontal lattice girders forming part of the auxiliary supporting means. Fig. 4 is an enlarged elevation of one of the tapered radial roof-supporting girders. Fig. 5 is an enlarged partial vertical section along line 5—5 of Fig. 1. Fig. 6 is a plan view of one of the roof panels. Fig. 7 is an enlarged detail showing the arrangement for attaching the radial girders to the flanges on the central mast.

Referring to Figs. 1 and 2, the central mast 1 may comprise a hollow cylindrical column, conveniently two sections of standard pipe 2 and 3 joined by a flanged connection 4. The central mast is provided with flanges 5 and 6 at the upper end and lower end, respectively. If desired, a single pipe may be employed and an intermediate flange attached thereto, as by welding, at a substantial distance below its upper end in a position corresponding to the flanged connection 4. The main body of the auxiliary columns 7 advantageously may also be formed of standard pipe of the desired length and diameter and each auxiliary column also is provided with flanges 8 and 9 at its upper end and lower end, respectively. The central mast 1 and the auxiliary columns 7 are positioned vertically by attachment of the flanges 6 and 9 to the flanges 10 and 11 which form a part of the foundation structure. Flanges 10 and 11 are attached to relatively short pipe sections 12 and 13, respectively, which are embedded in the foundation piers 14 and 15, respectively.

Horizontal lattice girders 16 extend between and are attached to the upper ends of adjacent auxiliary supporting columns. The horizontal lattice girders 16 are prefabricated and advantageously of welded construction. The outwardly extending flanges of its end members 17 and 18 are drilled or punched to provide a group of holes spaced to match with a corresponding group of holes in the main body of the auxiliary columns adjacent their upper end. The upper flanges of the lattice girder 16 are cut away at the ends as shown at 19 in Fig. 3 so as to permit attachment of girders 16 to the auxiliary supporting columns 7 with the upper surfaces of the former in the same horizontal plane as the upper surfaces of the flanges 8.

The tapered radial roof-supporting girders 20 also are prefabricated and advantageously of welded construction. The depth of these tapered radial girders at their wide ends corresponds with the distance between the upper surfaces of the flanges 4 and 5. The web on the top member is cut away as shown at 21 in Fig. 4 and the extended top flange is bent downwardly to a plane parallel with the plane of the flange on the lower member as illustrated at 22 in Fig. 4. The upper and lower flanges of the tapered radial girders are punched or drilled to provide a series of holes spaced to match a corresponding series of holes in the flanges 5 and 4 as shown in Fig. 7. A similar series of holes is provided in flanges 4 and 5 at intervals equally spaced angularly about the axis of the central mast. The relationship of the length of the upper and lower members of the radial girders 20 is such that the lower edges of these radial girders will lie in a horizontal plane when the girders are attached at their wide ends to the central mast. The lower flanges of alternate radial girders should be provided with holes spaced to register with a corresponding series of holes in the flanges 8. The lower flange of each of the remaining radial girders should be provided with a series of holes spaced to match a corresponding series of holes in the upper flange of one of the horizontal lattice girders 16 adjacent the mid-point of the latter.

The roof covering comprises a cap 27 and eight similar series of trapezoidal roof panels which advantageously are prefabricated and of welded construction. Each panel consists of a relatively long outer channel member 23, a relatively short inner channel 24, two side channels 25 and a plate 26. The side channels 25 are inclined with respect to each other at an angle corresponding to the angle between the top members of adjacent tapered radial girders. The distance between the parallel sides of the plate 26 substantially exceeds the distance between the outer edges of the parallel channels 23 and 24. At its wide end the plate 26 extends beyond the outer edge of the channel 23 and is raised so as to overlie the plate of an adjacent panel. The length of the outer edge of the outer channel of the longest panel of each series corresponds with the distance between the mid-points of adjacent radial girders 20 at their outer extremities. The construction of each panel of a series is the same except as to width, the outer edge of the outer channel of each panel in a series, except the widest, being of the same length as the shortest edge of the inner channel of the next wider panel in the series. The lower flanges of the side channels of the roof panels are drilled or punched to match a corresponding series of holes in the top flanges of the radial girders. Likewise the web of the inner channel of each panel of a series except the shortest is drilled or punched to match a corresponding series of holes in the web of the outer channel of the next narrower panel.

Where the climatic conditions make it desirable to provide for enclosure at the periphery, closure may be provided by a series of accordion-type doors. One suitable arrangement is diagrammatically illustrated in Fig. 1 where one such door is shown in the closed position at 28 and another in an open position at 29. These doors advantageously may be suspended from rollers fitted to traverse a track interiorly. One track member is shown at 30 in Fig. 5. The track members may be supported by attachment to the webs of the outer channels of the roof panels.

Moreover, where climatic conditions warrant, a system of heaters may be provided at positions selected to permit preheating of the engines of the housed aircraft, or their maintenance at an elevated temperature. Such a heating system not only permits a saving in time and in motor fuel by minimizing the warming up time, but it also increases the useful engine operating time (i. e., flying time) between engine overhauls, since engine operating time during the warming up period as well as flying time is included in determining the period between engine overhauls. A system of heaters suitable for this purpose may comprise a down-draft space heater supported from the lower edge of each alternate radial girder near the outer extremity thereof as illustrated diagrammatically at 31 in Figs. 1 and 2. The position of each down-draft heater should be such as to lie directly above the engine of an aircraft as illustrated in Fig. 2. The heating elements of the down-draft space heaters advantageously may be heated either by electricity or by the circulation of hot water from a centrally located water heater of conventional design. Canvas ducts 32 may depend from the space heaters to confine the downward draft of heated air to the immediate vicinity of the engine to be heated.

It will be apparent that the type of construction employed in the hangar illustrated in the drawings can with obvious modifications, be incorporated in polygonal structures having either more than or less than eight sides. However, the illustrated octagonal construction is preferred not only for its simplicity but because it is adapted to permit most effective utilization of the covered space. In this form of structure the shape of the floor area included between the radial girders that overlie adjacent auxiliary supporting columns and the outer extremity of the intervening radial girder, rather closely conforms with that occupied by an airplane of conventional design as illustrated by the airplane shown in outline at 33 in Figs. 1 and 2. The relatively small floor area between projections of alternate girders adjacent the central mast, which is not available for the primary objective of housing airplanes, may, if desired, be enclosed to provide an interior room adapted for a central heating system, for storage for spare parts, or the like.

The external appearance of hangars constructed in accordance with my invention, by reason of their general shape, their freedom from externally visible supporting trusses or cables, and the circumstance that the wall and roof coverings comprise a relatively small number of elements of considerable area, is such as to be readily susceptible to camouflage. Indeed a considerable degree of camouflage may be provided for prior to assembly merely by suitable coloring of the doors and roof panels.

While the novel housing structures of my invention are designed and intended primarily to provide for low cost decentralized aircraft housing, it will be apparent that they can be usefully employed for many other purposes.

I claim:

1. A structure for housing aircraft comprising a central mast, a plurality of similar radially disposed tapered roof-carrying lattice girders attached at their wide ends to said mast at elevations vertically spaced apart a substantial distance, said radial girders being positioned to extend outwardly from said mast at intervals equally spaced angularly around said mast and with their lower edges in a horizontal plane, a covering mounted on the upper edges of said radial girders and supported thereby, and auxiliary supporting means for said radial girders consisting of a vertical auxiliary column positioned under and extending upwardly to each alternate radial girder at a point positioned approximately midway between said central mast and the outer end of the radial girder, and horizontal lattice girders extending between and secured to the upper portions of adjacent auxiliary columns, whereby the upper edges of said horizontal lattice girders furnish auxiliary support for the lower edges of the radial girders disposed between the auxiliary supporting columns.

2. A structure for housing aircraft comprising a central mast, eight similar radially disposed tapered roof-carrying lattice girders attached at their wide ends to said mast at elevations spaced apart a substantial distance, said radial girders being positioned to extend outwardly from said mast at angularly spaced intervals of 45 degrees and with their lower edges in a horizontal plane, a covering mounted on the upper edges of said radial girders and supported thereby, and auxiliary supporting means for said radial girders consisting of a vertical auxiliary column positioned under and extending upwardly to each alternate radial girder at a point positioned approximately midway between said central mast and the outer end of the radial girder, and horizontal lattice girders extending between and secured to the upper portions of adjacent auxiliary columns, whereby the upper edges of said horizontal lattice girders furnish auxiliary support for the lower edges of the radial girders disposed between the auxiliary supporting columns.

3. In a structure of the class described the combination of a vertically disposed central mast having outwardly extending flanges at its upper and lower ends and at an intermediate point spaced a substantial distance below its upper end, a plurality of similar radially disposed tapered roof-carrying lattice girders each having an upper and lower member spaced apart at the wide end of the girder a distance corresponding to the distance between the top flange and the intermediate flange on said central mast, means for attaching the wide ends of said radial girders to the central mast at the top and intermediate flanges thereof with the tapered outwardly extending ends of said radial girders spaced at equal angular intervals around the central mast and with the lower edges of said radial girders in a horizontal plane, a covering mounted on the upper edges of said radial girders and supported thereby, auxiliary supporting means for said radial girders consisting of a vertical auxiliary column flanged at its lower end disposed under and extending upwardly to each alternate radial girder at a point positioned approximately midway between said central mast and the outer end of the radial girder, and horizontal lattice girders extending between and secured to the upper portions of adjacent auxiliary columns, foundations spaced to register generally with said central mast and said auxiliary supporting columns, said foundations having rigidly mounted flanges anchored therein in positions spaced to register with the flanges at the lower ends of said masts and auxiliary supporting columns, and registering apertures in said rigidly mounted flanges and the flanges at the lower ends of said mast and auxiliary supporting columns.

4. A structure for housing aircraft comprising a central mast, a plurality of similar radially disposed tapered roof-carrying lattice girders attached at their wide ends to said mast at elevations vertically spaced apart a substantial distance, said radial girders being positioned to extend outwardly from said mast at intervals equally spaced angularly around said mast and with their lower edges in a horizontal plane, a covering supported by said radial girders, said covering comprising a plurality of similar groups of trapezoidal panels of progressively decreasing length each panel extending between and being supported at its opposite ends by adjacent radial girders, and auxiliary supporting means for said radial girders consisting of a vertical auxiliary column positioned under and extending upwardly to each alternate radial girder at a point positioned approximately midway between said central mast and the outer end of the radial girder, and horizontal lattice girders extending between and secured to the upper portions of adjacent auxiliary columns, whereby the upper edges of said horizontal lattice girders furnish auxiliary support for the lower edges of the radial girders disposed between the auxiliary supporting columns.

HUGH CURRAN.